US009286707B1

(12) United States Patent
Switkin (10) Patent No.: US 9,286,707 B1
(45) Date of Patent: Mar. 15, 2016

(54) REMOVING TRANSIENT OBJECTS TO SYNTHESIZE AN UNOBSTRUCTED IMAGE (71) Applicant: Google Inc., Mountain View, CA (US)

(72) Inventor: Daniel Jules Switkin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 14/245,439

(22) Filed: Apr. 4, 2014

Related U.S. Application Data (60) Provisional application No. 61/931,969, filed on Jan. 27, 2014.

(51) Int. Cl.
G06K 9/00 (2006.01)
G06T 11/60 (2006.01)
G06K 9/46 (2006.01)

(52) U.S. Cl.
CPC .............. *G06T 11/60* (2013.01); *G06K 9/4652* (2013.01)

(58) Field of Classification Search
None
See application file for complete search history.

(56) References Cited

U.S. PATENT DOCUMENTS 7,142,697 B2* 11/2006 Huang et al. ................. 382/118
2003/0215143 A1* 11/2003 Zakrzewski et al. ......... 382/190
2011/0103644 A1* 5/2011 Garten ......................... 382/103
2011/0293190 A1* 12/2011 O'Callaghan ................ 382/197
2015/0117794 A1 4/2015 Murphy-Chutorian et al.

OTHER PUBLICATIONS

Alexa, "Extracting the Essence from Sets of Images", Computational Aesthetics in Graphics, Visualization, and Imaging, 2007, pp. 1-8, (published before this application Apr. 2014).
Elhabian et al., "Moving Object Detection in Spatial Domain Using Background Removal Techniques—State-of-Art", Recent Patents on Computer Science, vol. 1, 2008, pp. 32-54, (published before this application Apr. 2014).
Valdes, "Pattern and Transient Removal Algorithms", Astronomical Data Analysis II, vol. 4847, Waikoloa, Hawaii, Aug. 22, 2002 pp. 217-227.
Zaharescu et al., "Multi-Scale Multi-Feature Codebook-Based Background Subtraction", IEEE International Conference on Computer Vision Workshops, Barcelona, Spain, Nov. 6-13, 2011, pp. 1753-1760.
Auto Awesome Photos & Movies, https://support.google.com/plus/answer/3113884?hl=en, retrieved on Nov. 13, 2013, 3 pages.

* cited by examiner

*Primary Examiner* — Eueng-Nan Yeh
(74) *Attorney, Agent, or Firm* — Dority & Manning, P.A.

(57) ABSTRACT

In one aspect, the present subject matter is directed to a computer-implemented method for removing transient objects to synthesize an unobstructed image. The method includes receiving a plurality of images from a user. A most common value at a same pixel of each image is determined to infer pixels associated with a background of the images. A composition is generated from the received images, wherein the composition includes one of the pixels associated with the background of the images in place of a pixel associated with a foreground of at least one of the images.

19 Claims, 8 Drawing Sheets

REMOVING TRANSIENT OBJECTS TO SYNTHESIZE AN UNOBSTRUCTED IMAGE

PRIORITY CLAIM

This application claims priority to U.S. Provisional Patent Application Ser. No. 61/931,969 entitled "Removing Transient Objects to Synthesize an Unobstructed Image" filed on Jan. 27, 2014.

FIELD

The present subject matter relates generally to a system and method for removing transient objects to synthesize an unobstructed image.

BACKGROUND

Various systems enable users to upload images and to create image albums. Such systems can also enable users to share images with each other. Often, however, it can be difficult for a user to capture an unobstructed image of an object of interest. As such, users may not be able to store and/or share unobscured images of an object of interest.

SUMMARY

Aspects and advantages of embodiments of the invention will be set forth in part in the following description, or may be obvious from the description, or may be learned through practice of the embodiments.

In one aspect, the present subject matter is directed to a computer-implemented method for removing transient objects to synthesize an unobstructed image. The method includes receiving a plurality of images from a user. A most common value at a same pixel of each image is determined to infer pixels associated with a background of the images. A composition is generated from the received images, wherein the composition includes one of the pixels associated with the background of the images in place of a pixel associated with a foreground of at least one of the images.

Other exemplary aspects of the present disclosure are directed to other methods, systems, apparatus, non-transitory computer-readable media, user interfaces and devices for geo-locating images.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to a system and method for synthesizing an unobstructed image. Specifically, the present disclosure provides for removal of transient objects from a collection of images. In several embodiments, a most common value at a same pixel of each image is determined to infer pixels associated with a background of the images. Pixels associated with transient objects can be replaced by such background pixels to generate unobstructed imagery. Images can be generated in which the subject and/or background are visible with no transient objects obscuring their view.

In this regard, a median filter across images at each pixel can be utilized to determine a most common value at a same pixel of each image. In particular, in certain aspects of the present disclosure, it has been determined that the most common value at a same pixel among different images is not necessarily the majority. In certain aspects of the present disclosure, any suitable pixel description can be utilized to determine a most common value. For instance, pixel luminance, hue, saturation, or combinations thereof can be utilized. Indeed, in certain aspects of the present disclosure, original pixel R, G, B values can be utilized to determine a most common value in accordance with certain aspects of the present disclosure.

In certain embodiments of the present disclosure, implementations for generating compositions in a social network system are described. In various implementations, a system receives images from a user. The system then determines a composition from the images. For example, the composition can include a clutter-free composition, as will be described in more detail herein.

The system can generate the composition from the received images based on modified foregrounds of the images, where the generating includes one or more of aligning, normalizing, smoothing, and blending images used in each generated composition.

In some implementations, the composition type includes one or more clutter-free compositions. In some implementations, the generating of the one or more compositions includes: selecting images from the received images for a clutter-free composition based on predetermined clutter-free selection criteria; detecting one or more clutter objects in each of the selected images based on predetermined clutter detection criteria; and generating a clutter-free composition, where one or more clutter objects are absent in the clutter-free composition. The system then provides the one or more generated compositions to the user.

Figure 1:
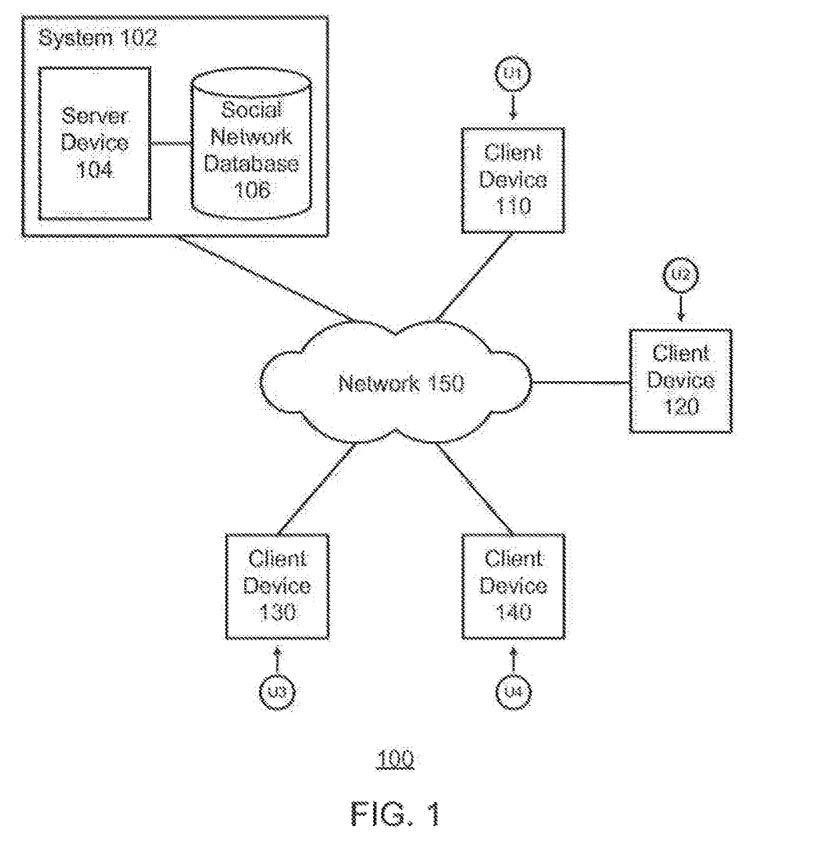
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term "system" and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit compositional media content to each other.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
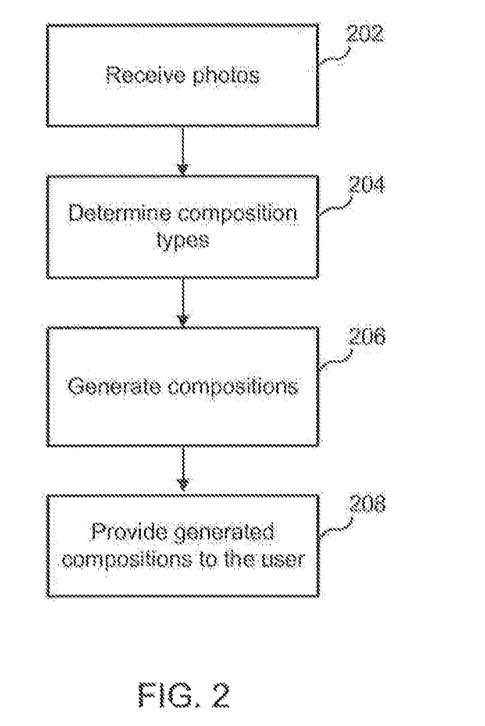
FIG. 2 illustrates an example simplified flow diagram for generating compositions, according to some implementations.

FIG. 2 illustrates an example simplified flow diagram for generating compositions, according to some implementations. In various implementations, system 102 may generate compositions in a social network system, or anywhere visual media may be used and/or viewed. Referring to both FIGS. 1 and 2, a method is initiated in block 202, where system 102 receives a set of images from a user. In various implementations, the images may be received when the user uploads the images to system 102 or after the user adds the images to one or more photo albums. In some implementations, system 102 may enable a camera device (e.g., smart phone) of the user to automatically upload images to system 102 as the camera device captures images. Any suitable images can be utilized. In particular embodiments of the present disclosure, a sequence of images gathered in a relatively short period of time can be uploaded. It should be understood that while such images can be provided individually, images can also be extracted from a movie or from any other suitable method as would be understood to one of ordinary skill in the art.

In block 204, system 102 determines a composition type from the images. The composition types can include clutter-free compositions. As described in more detail below, system 102 determines which types of compositions that can be generated from the images. To do so, in various implementations, system 102 analyzes the images to determine which images are appropriate for each type of composition. In various implementations, system 102 considers images that are taken in sequence and that are visually similar within frames of images to be candidates for clutter-free compositions.

In various implementations, to determine the composition types that can be made from the images, system 102 utilizes recognition algorithms to analyze images in order to find appropriate images for different composition types. In various implementations, system 102 analyzes a sequence of images to detect which components are foreground and background, including which objects are in the foreground and which objects are in the background.

For example, system 102 may read all of the values at each pixel across all images to recognize a foreground object in a series of images, where the foreground object is in different positions in the different images relative to a static background. System 102 may determine that such images are good candidates for a composition.

For example, all of the values at each pixel across images can be read and placed into a temporary storage and sorted. Any suitable description of the pixel can be utilized. The values of the temporary storage can be reviewed to calculate the difference between each adjacent pair of values. The sum of the absolute value of such differences can be then be calculated over a window. The window with the minimum sum can be located, to indicate the most representative values. In certain implementations, the values from such window can be averaged or, alternatively, a single value can be selected.

In certain aspects of the present disclosure, a single value from the aforementioned window can result in the index of the source image associated with such value being stored in a two-dimensional array. The array can be the same size as the source images and, therefore, the same as the result image. In this manner, a map of which source image each pixel is associated with can be created.

Once created, in certain implementations a median filter can be run on the map to assist in determining which source image is utilized so that such source image pixel is fetched and written to the result. In certain implementations, the map is searched over a box to determine the most common occurring value. For example, a histogram can be utilized to locate the most entries and determine the source image, with the source pixel being written to the final result image. In accordance with the present disclosure, the approaches outlined herein can lessen the number of stray pixels which come from a difference source image than their neighbors.

In some implementations, to determine composition types from the images, system 102 may determine similar content in the different images in a group of images. For example, system 102 may recognize the same object in the center region of the group of images. In another example, system 102 may recognize the same monument in a group of images. In some implementations, system 102 may determine the similarity of images based on metadata in the images. For example, metadata such as tags, timestamps, geo-location, etc. may indicate similar images.

In block 206, system 102 generates a composition from the received images based on the determined composition types. In various implementations, to generate compositions from the images, system 102 selects candidate images from a set or group of images based on the determined composition type. The selection process may occur as a part of or prior to the generation processes. Various implementations for selecting candidate images are described in more detail herein.

In various implementations, each composition is based on modified foregrounds of the images. For example, system 102 may generate a clutter-free composition that shows an object such as a building, monument, landscaping, etc., that is absent of visual obstructions such as bystanders, cars, etc. To generate a clutter-free composition, system 102 removes or "erases" such visual obstructions.

When generating compositions, system 102 may perform one or more of aligning images used in each generated composition, normalizing images used in each generated composition, smoothing images used in each generated composition, and blending images used in each generated composition.

In block 208, system 102 provides the one or more generated compositions to the user. For example, in some implementations, system 102 may send a message to the user indicating that system 102 has generated one or more compositions and has added the compositions to the user's upload stream or image album. In various implementations, system 102 may generate and cause a visual badge to overlay an image associated with the composition. In various implementations, system 102 may generate and cause a second or combined visual badge to overlay the composition, where the visual badge indicates the type of composition (e.g., a clutter-free composition, etc.).

In some implementations, system 102 may allow for some user interaction or feedback. For example, rather than automatically generating an animation, system 102 may detect images that would make a particular composition and then prompt the user to initiate generation of the composition (e.g., with a single click or selection of a button).

In some implementations, for clutter-free compositions (described below), if pixels agree on the same color there is a high confidence that such pixels are background pixels. For example, if there are 5 pixels in a given location of 5 images, and 4 pixels have the same color value, there is high confidence that the 4 pixels are background pixels. Again, any description of a pixel can be utilized to determine a most common value at a same pixel of each image.

In various implementations, system 102 applies a blending algorithm to add or combine pixels together. In various implementations, system 102 applies a blending algorithm when generating clutter-free compositions.

In various implementations, in order to generate high-quality compositions, system 102 applies various algorithms that align, normalize, smooth, and blend images (including pixels of images) used in each generated composition. In some implementations, system 102 might not generate a composition for a sequence of images if the images cannot be aligned, normalized, smoothed, and/or blended to generate a high-quality composition. This avoids compositions where an object such as a person is partially shown, or an object shows up twice in a composition. In various implementations, system 102 applies the algorithms for aligning, normalizing, smoothing, and blending images generating clutter-free compositions.

In various implementations, system 102 applies an alignment algorithm that aligns images when generating compositions. In particular, system 102 may align the static portions of images together. System 102 may also match feature point across pairs of images. In some implementations, system 102 may align images by homography (e.g., homography transformations), a technology used in video stabilization.

In various implementations, system 102 applies a normalization algorithm that performs color adjustments and color voting to the images when generating compositions. To make color adjustments, system 102 normalizes the color of each image to a reference. This adjusts for changes in lighting and keeps consistent color among the images.

In some implementations, system 102 applies color voting, where each overlapping pixel for the aligned sequence votes using the pixel color. In some implementations, system 102 may apply the normalization algorithm to the images in order to normalize various other image parameters (e.g., exposure, brightness, contrast, etc.) in the images.

In some implementations, system 102 may apply a smoothing algorithm to the images in order to smooth the pixel votes using an energy minimization algorithm. In various implementations, the energy minimization algorithm 102 prefers color consistency over boundaries. The energy minimization algorithm 102 may also apply a penalty for small regions or disjointed regions.

In some implementations, system 102 may apply a blending algorithm to perform blending on stitch boundaries in order to reduce artifacts. In some implementations, system 102 may apply an inpainting algorithm using generalized distance transforms to fill holes where no image had suitable background examples. In some implementations, the inpainting algorithm may use a generalized distance transform to find the pixel with minimum distance to each low confidence pixel, and use this as reference. The inpainting algorithm may also find the closest label for each pixel that matches the reference.

In some implementations, stitching artifacts can be reduced by performing Gaussian smoothing on the edges. In some implementations, to avoid merging with foreground pixels, system 102 may skip high contrast regions.

Figure 3:
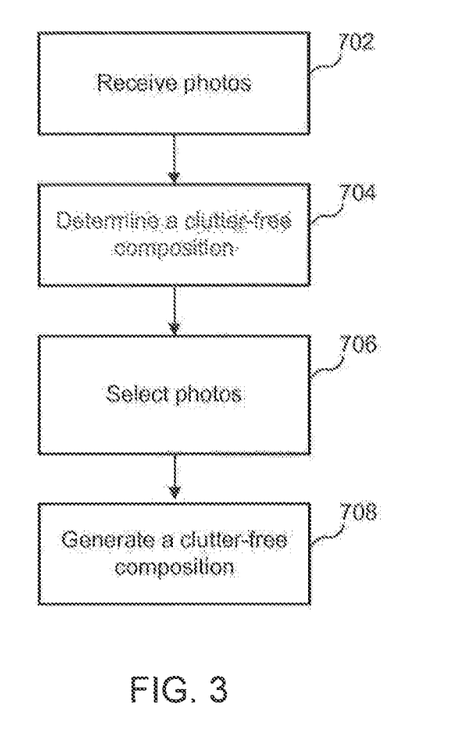
FIG. 3 illustrates an example simplified flow diagram for generating a clutter-free composition, according to some implementations.

FIG. 3 illustrates an example simplified flow diagram for generating a clutter-free composition, according to some implementations. Referring to both FIGS. 1 and 3, a method is initiated in block 702, where system 102 receives a set of images from a user.

In block 704, system 102 determines a clutter-free composition from the images. In other words, system 102 determines that at least some of the received images are good candidates to construct a clutter-free composition. In certain implementations, preprocessing can be utilized to determine sharpness of one or more of the images to determine whether images are suitable.

As indicated above, a clutter-free composition is based on modified foregrounds of the images. For example, system 102 may generate a clutter-free composition that shows an object such as a building, monument, landscaping, etc., that is absent of visual obstructions such as bystanders, cars, etc. System 102 may construct the clutter-free composition using multiple images from a set of images, where each image reveals different portions of an object (e.g., different portions of a monument).

In block 706, system 102 selects images from the received images for a clutter-free composition based on predetermined clutter-free selection criteria. For example, the predetermined clutter-free selection criteria may include a determination that the images were captured in sequence. In various implementations, the predetermined selection criteria may include a determination that similar content in the images and that such content is often occluded by people: boardwalk, bridge, building, city, downtown, house, properties, road, skyscraper, street, structure, tower, etc., or have an object recognition match to a physical place (e.g., a landmark, etc.). System 102 may utilize any suitable algorithm to annotate images and match landmarks. In various implementations, system 102 may utilize any suitable computer vision annotation for scenes. In some implementations, system 102 may enable the user to select which images sequences are appropriate for a clutter-free composition.

Figure 4:
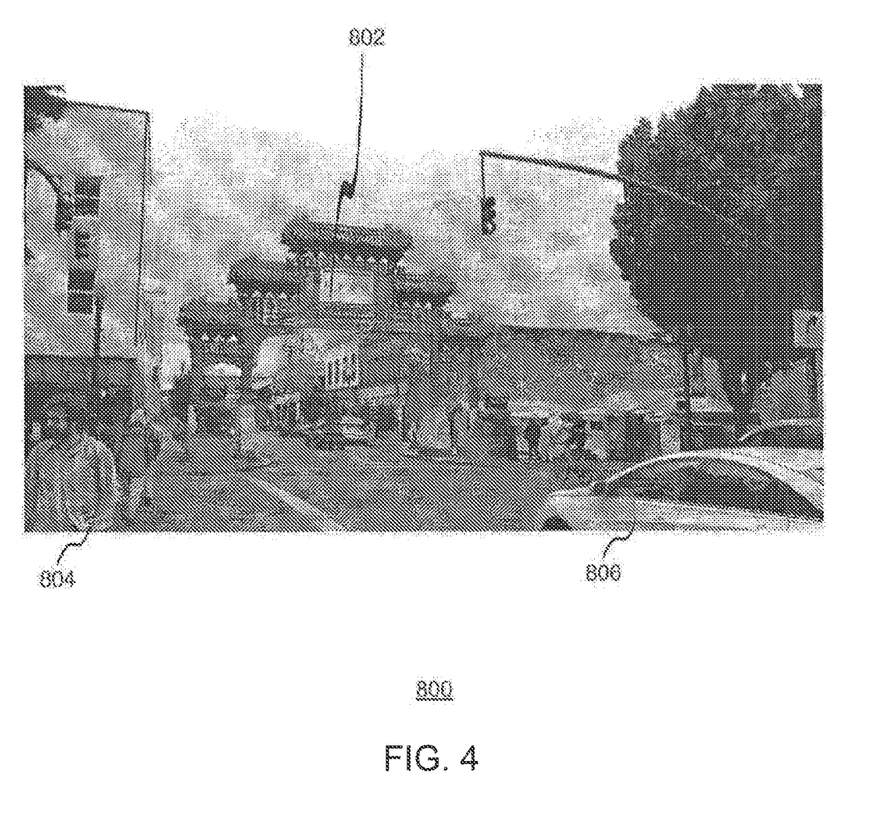
FIG. 4 illustrates an example selected image for a clutter-free composition, according to some implementations.

FIG. 4 illustrates an example selected image 800 for a clutter-free composition, according to some implementations. FIG. 4 shows a monument 802 with a person 804 and a car 806 in the foreground of the scene.

Figure 5:
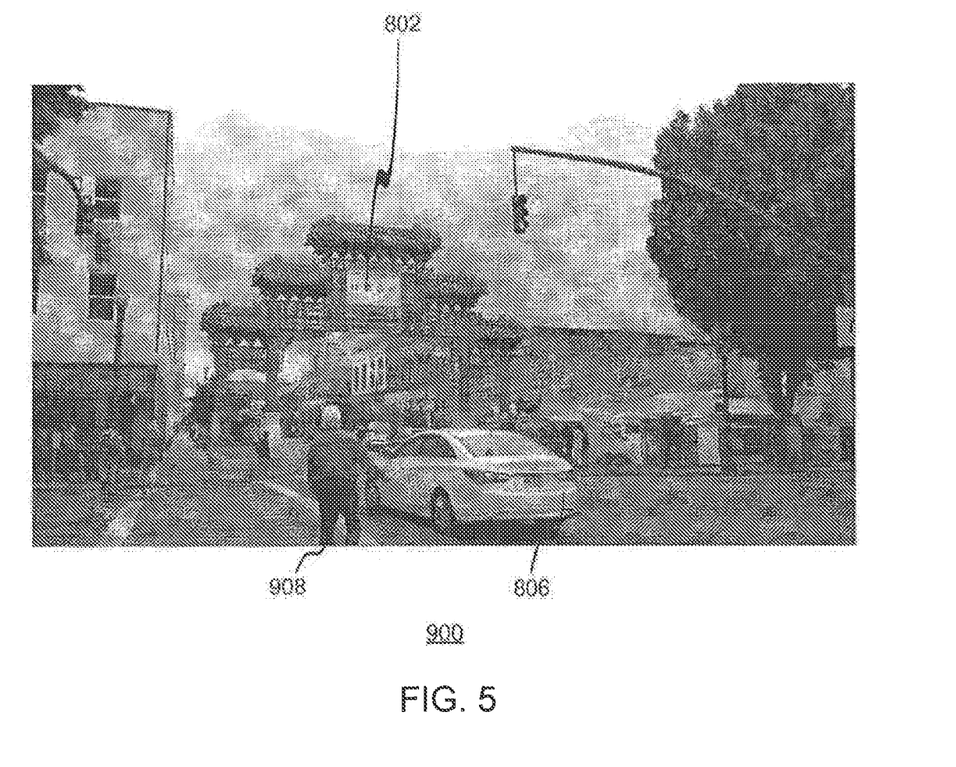
FIG. 5 illustrates an example selected image for the clutter-free composition, according to some implementations.

FIG. 5 illustrates an example selected image 900 for the clutter-free composition, according to some implementations. FIG. 5 shows monument 802 with a person 908 and car 806 in the foreground of the scene.

In block 708, system 102 generates a clutter-free composition, where one or more clutter objects are absent in the clutter-free composition.

Figure 6:
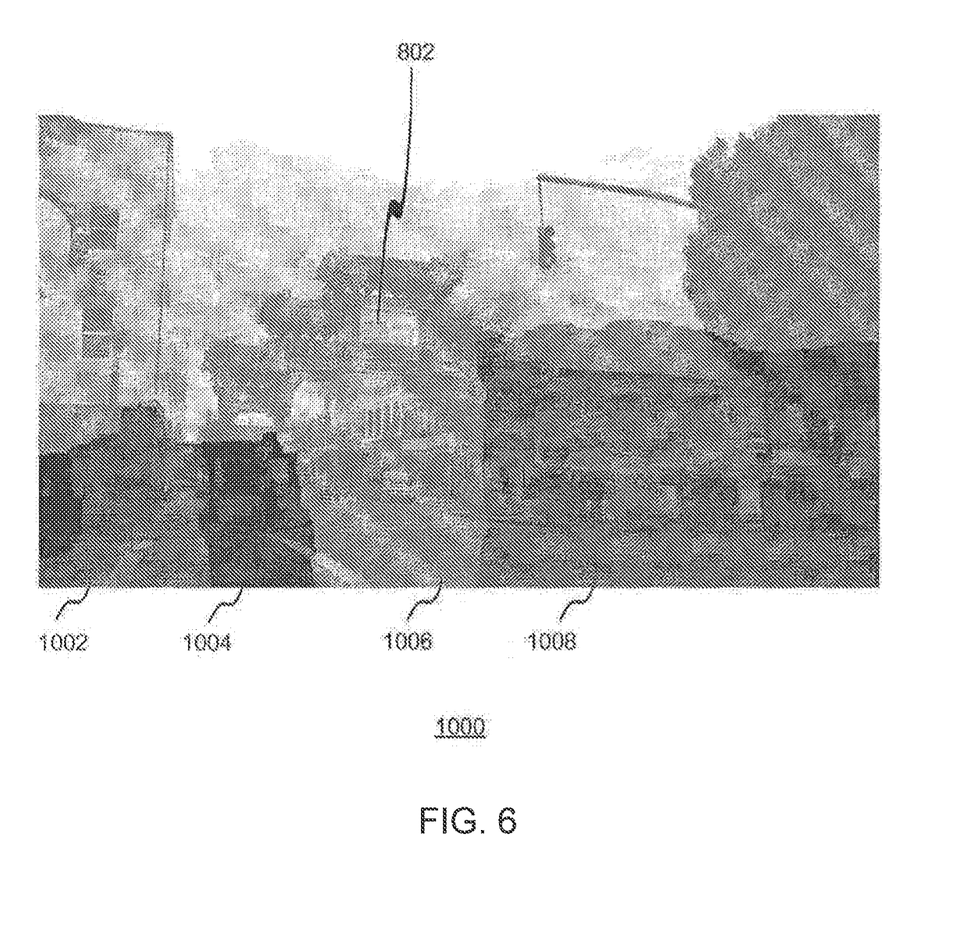
FIG. 6 illustrates an example preliminary clutter-free composition, according to some implementations.

FIG. 6 illustrates an example preliminary clutter-free composition 1000, according to some implementations. In various implementations, clutter-free composition 1000 includes portions of images, where objects (e.g., person 804, car 806, and person 908, and of respective images 800 and 900 of FIGS. 4 and 5) are removed or "erased." System 102 achieves this by substituting pixels with "clutter" in particular portions of the scene with pixels without clutter in those same portions, where the pixels without clutter are taken from other images in the sequence of images.

In this example implementations, the base image is image 800 of FIG. 4 showing monument 802. Patches 1002, 1004, 1006, and 1008 other images show portions where person 804, car 806, person 908, and other objects are absent from the scene. In various implementations, system 102 identifies corresponding patches in the sequence of images where the objects are absent and uses those patches to provide the clutter-free composition.

In various implementations, system 102 removes as many cluttering objects as possible in order to create a clutter-free composition. As indicated above, in various implementations, system 102 applies the algorithms for aligning, normalizing, smoothing, and blending images generating clutter-free compositions.

Figure 7:
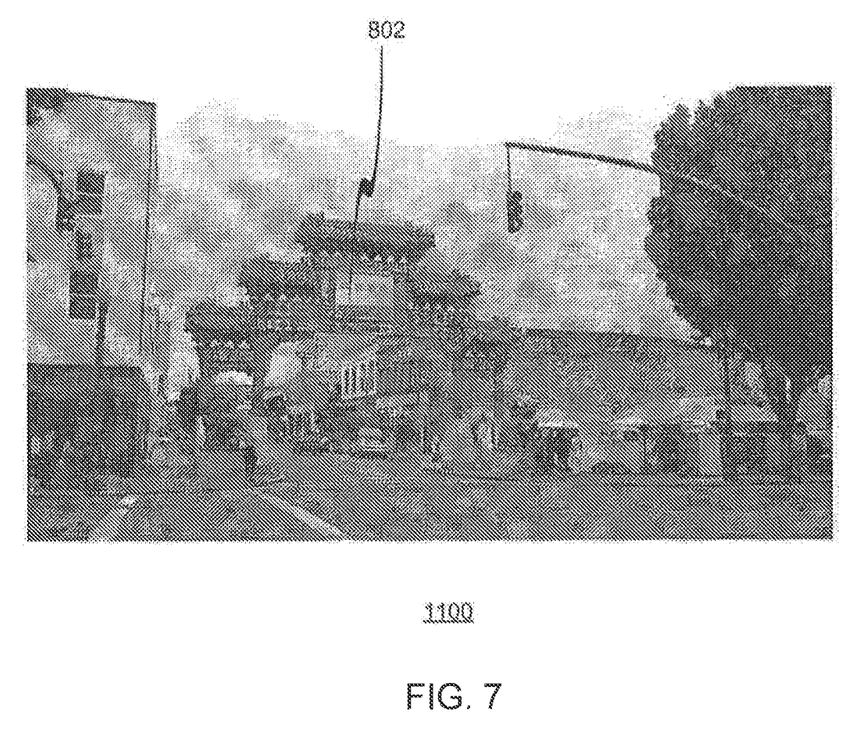
FIG. 7 illustrates an example clutter-free composition, according to some implementations.

FIG. 7 illustrates an example clutter-free composition 1100, according to some implementations. FIG. 7 shows monument 802 without particular object (e.g., people, cars, etc.) blocking the view of monument 802. In certain aspects of the present disclosure, with no user-action, system 102 generates a single composition or image that eliminates unwanted foreground by blending clutter-free backgrounds from multiple images.

While some example implementations are described in the context of a monument, such implementations and others may apply to other objects (e.g., buildings, landscapes, etc.).

In various implementations, system 102 determines whether to erase or remove particular foreground objects. In some scenarios, the user might not want particular objects such as friends, family, etc. removed from an image even if in front of a monument. In such situations, the person whom the person taking the picture (e.g., owner of the image) intends to remain in the image would probably be centered and not moving much. In some implementations, system 102 may recognize a person in an image as a social connection to the person taking the picture. As such, system 102 would leave in the person, while removing other people walking by.

In some implementations, multiple types of compositions described herein may be applied to an image or group of images. In various implementations, system 102 may generate compositions that include different combinations of clutter-free compositions, etc. For example, in some implementations, system 102 may generate a clutter-free composition within another image. Actual combinations will depend on the specific implementations.

Although the steps, operations, or computations in the method implementations described herein may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference Images.

In some implementations, to recognize a face in an image, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations automatically generate clutter-free compositions that users can share with their friends. Such implementations require no manual effort from users, and, in particular, implementations require no user knowledge of how to create compositions. Implementations described herein also increase overall engagement among users in a social networking environment.

Figure 8:
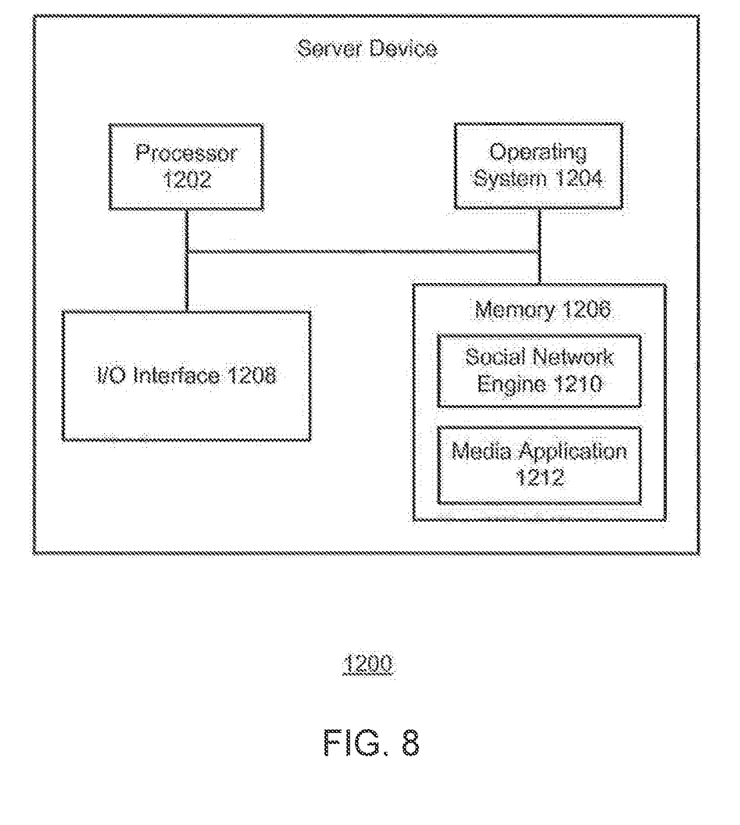
FIG. 8 illustrates a block diagram of an example server device, which may be used to implement the implementations described herein.

FIG. 8 illustrates a block diagram of an example server device 1200, which may be used to implement the implementations described herein. For example, server device 1200 may be used to implement server device 104 of FIG. 1, as well as to perform the method implementations described herein. In some implementations, server device 1200 includes a processor 1202, an operating system 1204, a memory 1206, and an input/output (110) interface 1208. Server device 1200 also includes a social network engine 1210 and a media application 1212, which may be stored in memory 1206 or on any other suitable storage location or computer-readable medium. Media application 1212 provides instructions that enable processor 1202 to perform the functions described herein and other functions.

For ease of illustration, FIG. 12 shows one block for each of processor 1202, operating system 1204, memory 1206, I/O interface 1208, social network engine 1210, and media application 1212. These blocks 1202, 1204, 1206, 1208, 1210, and 1212 may represent multiple processors, operating systems, memories, I/O interfaces, social network engines, and media applications. In other implementations, server device 1200 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for removing transient objects to synthesize an unobstructed image comprising:
   receiving, by one or more computing devices, a plurality of images from a user, wherein the plurality of images comprise one or more transient objects;
   determining, by the one or more computing devices, a most common value at a same pixel of each image to infer pixels associated with a background of the images;
   determining, by the one or more computing devices, a most common value at a same pixel of each image to infer pixels associated with a foreground of at least one of the images wherein at least one of the pixels associated with the foreground of the at least one of the images are located in the same portion of the images as at least one of the pixels associated with a background of the images; and
   generating, by the one or more computing devices, a composition from the received images, wherein the composition comprises one of the pixels associated with the background of the images based on the determined most common value at a same pixel of each image as a replacement for a pixel associated with the foreground of at least one of the images based on the determined most common value at a same pixel of each image to synthesize an unobstructed image.

2. The computer-implemented method of claim 1, wherein the most common value at the same pixel of each image is not present in a majority of the same pixels.

3. The computer-implemented method of claim 1, wherein the most common value comprises luminance, hue, saturation, or combinations thereof.

4. The computer-implemented method of claim 1, wherein the most common value is determined by calculating a median value of each pixel of each image.

5. The computer-implemented method of claim 1, further comprising preprocessing one or more of the images prior to determining the most common value.

6. The computer-implemented method of claim 5, wherein preprocessing comprises determining sharpness of one or more of the images.

7. The computer-implemented method of claim 1, further comprising providing the composition to the user.

8. The computer-implemented method of claim 1, further comprising: aligning one or more of the images used in each generated composition.

9. The computer-implemented method of claim 1, further comprising: normalizing one or more of the images used in each generated composition.

10. The computer-implemented method of claim 1, further comprising: smoothing one or more of the images used in each generated composition.

11. A system for removing transient objects to synthesize an unobstructed image, the system comprising:
    one or more computing devices including one or more processors and associated memory, the memory storing instructions that, when executed by the one or more processors, configure the one or more computing devices to:
    receive a plurality of images from a user, wherein the plurality of images comprise one or more transient objects;
    determine a most common value at a same pixel of each image to infer pixels associated with a background of the images;
    determine a most common value at a same pixel of each image to infer pixels associated with a foreground of at least one of the images wherein at least one of the pixels associated with the foreground of the at least one of the images are located in the same portion of the images as at least one of the pixels associated with a background of the images; and
    generate a composition from the received images, wherein the composition comprises one of the pixels associated with the background of the images based on the determined most common value at a same pixel of each image as a replacement for a pixel associated with the foreground of at least one of the images based on the determined most common value at a same pixel of each image to synthesize an unobstructed image.

12. The system of claim 11, wherein the most common value at the same pixel of each image is not present in a majority of the same pixels.

13. The system of claim 11, wherein the most common value comprises luminance, hue, saturation, or combinations thereof.

14. The system of claim 11, wherein the most common value is determined by calculating a median value of each pixel of each image.

15. The system of claim 11, further comprising providing the composition to the user.

16. A tangible, non-transitory computer-readable medium comprising:
    computer-executable instructions that, when executed by one or more processors,
    cause the one or more processors to perform operations, comprising:
    receiving a plurality of images from a user, wherein the plurality of images comprise one or more transient objects;
    determining a most common value at a same pixel of each image to infer pixels associated with a background of the images;
    determining, by the one or more computing devices, a most common value at a same pixel of each image to infer pixels associated with a foreground of at least one of the images wherein at least one of the pixels associated with the foreground of the at least one of the images are located in the same portion of the images as at least one of the pixels associated with a background of the images; and
    generating, a composition from the received images, wherein the composition comprises one of the pixels associated with the background of the images based on the determined most common value at a same pixel of each image as a replacement for a pixel associated with the foreground of at least one of the images based on the determined most common value at a same pixel of each image to synthesize an unobstructed image.

17. The computer readable medium of claim 16, wherein the most common value at the same pixel of each image is not present in a majority of the same pixels.

18. The computer readable medium of claim 16, wherein the most common value comprises luminance, hue, saturation, or combinations thereof.

19. The computer readable medium of claim 16, wherein the most common value is determined by calculating a median value of each pixel of each image.

* * * * *